US012711793B1

(12) United States Patent
Yang et al.

(10) Patent No.: US 12,711,793 B1
(45) Date of Patent: Aug. 18, 2026

(54) DEEPFAKE DETECTION IN DATA AT REST AND REAL-TIME NETWORK TRAFFIC

(71) Applicant: Netskope, Inc, Santa Clara, CA (US)

(72) Inventors: Siying Yang, Saratoga, CA (US); Krishna Narayanaswamy, Saratoga, CA (US); Sanjay Beri, Los Altos, CA (US); Yihua Liao, Palo Alto, CA (US); Jason Bryslawskyj, San Diego, CA (US); Xinjun Zhang, Fremont, CA (US)

(73) Assignee: NETSKOPE, INC., Santa Clara, CA (US)

( * ) Notice: Subject to any disclaimer, the term of this patent is extended or adjusted under 35 U.S.C. 154(b) by 0 days.

(21) Appl. No.: 19/330,538

(22) Filed: Sep. 16, 2025

Related U.S. Application Data

(60) Provisional application No. 63/797,052, filed on Apr. 29, 2025.

(51) Int. Cl.
*G06K 9/00* (2022.01)
*G06V 10/32* (2022.01)
(Continued)

(52) U.S. Cl.
CPC .............. *G06V 20/95* (2022.01); *G06V 10/32* (2022.01); *G06V 10/70* (2022.01); *G06V 20/46* (2022.01)

(58) Field of Classification Search
CPC ........ G06V 20/95; G06V 20/46; G06V 10/70; G06V 10/32; G06V 20/49; G06V 40/168;
(Continued)

(56) References Cited

U.S. PATENT DOCUMENTS

| | | | | |
|---|---|---|---|---|
| 10,977,693 | B2 | 4/2021 | Navin et al. | |
| 2014/0333413 | A1* | 11/2014 | Kursun | G06V 40/70 382/117 |

(Continued)

FOREIGN PATENT DOCUMENTS

| | | | |
|---|---|---|---|
| CN | 106549815 | A | 3/2017 |
| CN | 108766461 | B | 11/2018 |

(Continued)

OTHER PUBLICATIONS

Bhatia et al., "SafeCAll—Implementing Deepfake Audio Detection in An Open-Source Communication App," Proceedings of the International Conference on Industrial Engineering and Operations Management, 14th Annual International Conference on Industrial Engineering and Operations Management Dubai United Arab Emirates (UAE), Feb. 12-14, 2024, IEOM Society International, USA, Feb. 12, 2024, pp. 2478-2479.

(Continued)

*Primary Examiner* — Michael J Vanchy, Jr.
(74) *Attorney, Agent, or Firm* — MUGHAL GAUDRY & FRANKLIN PC

(57) ABSTRACT

A detecting deepfake system for detecting deepfake in live network traffic communications and stored media. Visual data and audio data are extracted from a plurality of users of an enterprise. Digital fingerprints are generated from the extracted visual data and audio data. The digital fingerprints are matched with the pre-stored fingerprints to produce an output. Further, the visual data and audio data are analyzed by Artificial Intelligence (AI)-detection model. A deepfake detection score is generated based on the analysis by the AI-detection model. The output from the matching of the digital fingerprints with the pre-stored fingerprints and the deepfake detection score are combined to determine a level of deepfake in the extracted visual data and audio data. The
(Continued)

policies are applied based on the level of deepfake detected in the visual data and the audio data.

21 Claims, 9 Drawing Sheets

(51) Int. Cl.

| | |
|---|---|
| ***G06V 10/70*** | (2022.01) |
| ***G06V 20/00*** | (2022.01) |
| ***G06V 20/40*** | (2022.01) |

(58) Field of Classification Search

CPC ...... G06V 40/171; G06V 40/20; G06V 40/40; G06V 40/70; G06F 18/21; G06F 18/22; G10L 17/10; G10L 17/22; G10L 17/02; G10L 17/04; G10L 17/08; G10L 17/18

See application file for complete search history.

(56) References Cited

U.S. PATENT DOCUMENTS

| | | | | |
|---|---|---|---|---|
| 2021/0097260 | A1 | 4/2021 | Verma et al. | |
| 2021/0103937 | A1* | 4/2021 | Joglekar | G06Q 40/02 |
| 2021/0374391 | A1* | 12/2021 | Jorasch | G06V 40/19 |
| 2022/0121868 | A1* | 4/2022 | Chen | G10L 17/22 |
| 2024/0153306 | A1* | 5/2024 | Mohanty | G06V 40/45 |
| 2025/0148788 | A1* | 5/2025 | Bellinger | G06V 40/171 |
| 2025/0307358 | A1* | 10/2025 | Balasubramanian | G06F 21/44 |

FOREIGN PATENT DOCUMENTS

| | | | |
|---|---|---|---|
| CN | 110136744 | A | 8/2019 |
| CN | 111614659 | B | 9/2020 |
| CN | 111681680 | B | 9/2020 |
| CN | 111860414 | B | 10/2020 |
| CN | 113537042 | A | 10/2021 |
| CN | 116210052 | A | 6/2023 |
| CN | 116310937 | A | 6/2023 |
| CN | 116319467 | A | 6/2023 |
| CN | 116915718 | A | 10/2023 |
| KR | 20220108421 | A | 8/2022 |

OTHER PUBLICATIONS

Poredi et al., "Robustness of Electrical Network Frequency Signals as a Fingerprint for Digital Media Authentication," IEEE 2022, 24th International Workshop on Multimedia Signal Processing (MMSP) , accessed on Sep. 19, 2025 at: chrome-extension://efaidnbmnnnibpcajpcglclefindmkaj/https://par.nsf.gov/servlets/purl/10359386.

Xie et al., "Generalized Source Tracing: Detecting Novel Audio Deepfake Algorithm With Real Emphasis and Fake Dispersion Straiegy," Interspeech 2024, Sep. 1-5, 2024, Kos, Greece, pp. 4833-4837.

Yi et al., "Audio Deepfake Detection—A Survey," Journal of Latex Class Files, voi. 14, No. 8, Aug. 2023, pp. 1-20.

* cited by examiner

DEEPFAKE DETECTION IN DATA AT REST AND REAL-TIME NETWORK TRAFFIC

PRIORITY

This application is a non-provisional of and claims priority to U.S. Provisional Patent Application No. 63/797,052, filed Apr. 29, 2025, and entitled "DEEPFAKE DETECTION," the contents of which are hereby incorporated by reference in their entirety for all purposes.

BACKGROUND

This disclosure generally relates to techniques for detecting deepfake media in data at rest and in real-time communications, utilizing digital fingerprints of authorized users, alongside traditional processes such as standalone AI models, biometric authentication, forensic analysis of media artifacts, digital watermarking, and cryptographic hashing.

Deepfake technology has become increasingly sophisticated and widespread, posing significant cybersecurity threats to enterprises, government institutions, and individuals. Malicious actors can generate highly realistic synthetic media, including images, videos, and audio, to impersonate executives, manipulate public perception, and commit fraud. These attacks can result in financial losses, reputational damage, and security breaches.

Current deepfake detection solutions primarily focus on post-event analysis, which is inadequate for real-time threat mitigation. Furthermore, these solutions lack integration with enterprise security infrastructures, making it difficult to detect and prevent deepfake media across both stored data and real-time communications.

SUMMARY

In one embodiment, present disclosure provides a deepfake detection system for detecting deepfake in live network traffic communications and stored media. A Visual data and an audio data are extracted from users of an enterprise. digital fingerprints are generated for an extracted visual data and audio data. The digital fingerprints are matched with the pre-stored fingerprints to produce an output. Further, the visual data and the audio data are analyzed by artificial intelligence (AI)-deepfake detection model. A deepfake detection score is generated based on analysis by the AI-deepfake detection model. output from matching of the digital fingerprints with the pre-stored fingerprints and the deepfake detection score are combined to determine a level of deepfake in the extracted visual data and audio data. Policies are applied based on the level of deepfake detected in the visual data and the audio data.

In an embodiment, a method for detection of deepfake in live network traffic communications and stored media is disclosed. In one step, visual data and audio data of users of an enterprise are extracted. Digital fingerprints are generated for the extracted visual data and audio data. The digital fingerprints are matched with pre-stored fingerprints to produce an output. Further, the visual data and audio data are analyzed by AI-deepfake detection model. A deepfake detection score is generated based on the analysis by the AI-deepfake detection model. The output from the matching of the digital fingerprints with the pre-stored fingerprints and the deepfake detection score are combined to determine a level of deepfake in the extracted visual data and audio data. Policies are applied based on the level of deepfake detected in the visual data and the audio data.

In another embodiment, a deepfake detection system for detection of deepfake in live network traffic communications and stored media. The system includes processors and memory that: extract visual data and audio data of users of an enterprise. Digital fingerprints are generated for the extracted visual data and audio data by a mid-link server. The digital fingerprints are matched with pre-stored fingerprints to produce an output. Further, the visual data and audio data are analyzed by AI-deepfake detection model. A deepfake detection score is generated based on the analysis by the AI-deepfake detection model. The output from the matching of the digital fingerprints with the pre-stored fingerprints and the deepfake detection score are combined to determine a level of deepfake in the extracted visual data and audio data. Policies are applied based on the level of deepfake detected in the visual data and the audio data.

In yet another embodiment, a non-transitory computer-readable storage medium is discussed having computer-executable instructions embodied thereon that when executed causes at least one computer to detect deepfake in live network traffic communications and stored media. The instructions comprise extraction of visual data and audio data of users of an enterprise. Digital fingerprints are generated from the extracted visual data and audio data. The digital fingerprints are matched with pre-stored fingerprints to produce an output. Further, the visual data and audio data are analyzed by AI-deepfake detection model. A deepfake detection score is generated based on the analysis by the AI-deepfake detection model. The output from the matching of the digital fingerprints with the pre-stored fingerprints and the deepfake detection score are combined to determine a level of deepfake in the extracted visual data and audio data. Policies are applied based on the level of deepfake detected in the visual data and the audio data.

Further areas of applicability of the present disclosure will become apparent from a detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
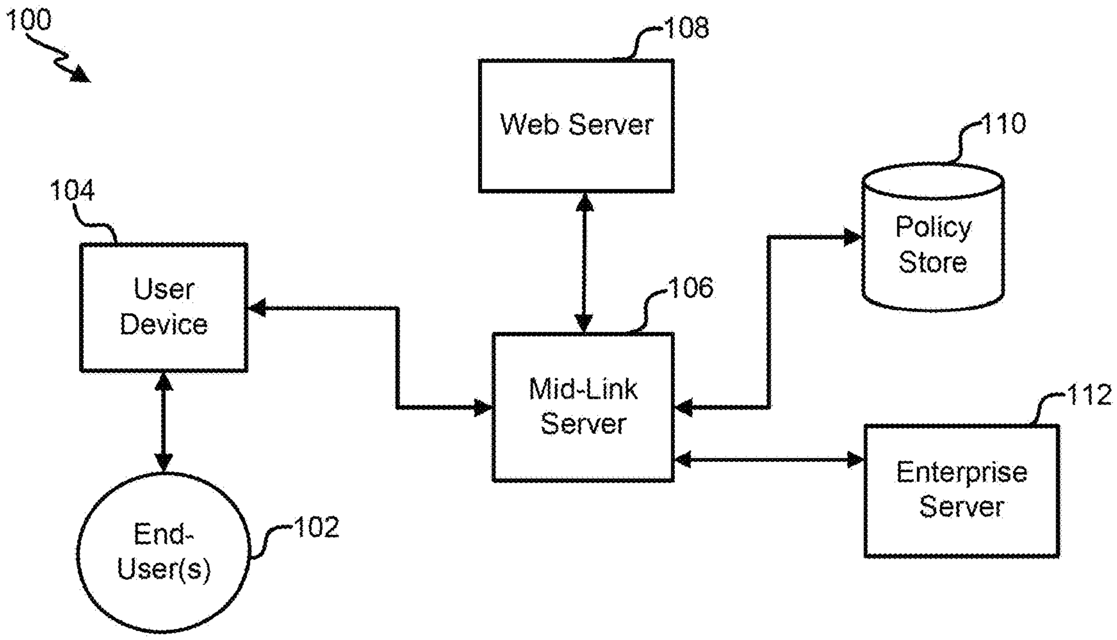
FIG. 1 illustrates a block diagram of a deepfake detection system.

Referring to FIG. 1, a block diagram of a deepfake detection system 100 is shown. The deepfake detection system 100 includes an end-user(s) 102, a user device(s) 104, a mid-link server 106, a web server 108, a policy store 110, and an enterprise server 112. The user device(s) 104, such as laptop(s), desktop(s), smartphone(s), tablet(s), Personal Computer(s), and any other computing devices, communicate with the web server 108 via the mid-link server 106 using the internet. The user device(s) 104 may be secured by using the mid-link server 106, which remotely hosts a secured software environment. The user device(s) 104 run any popular operating system (OS) such as Windows™, iOS™, Android™, Linux, set-top box OSes such as Real-Time Operating System (RTOS), Unix OS, Linux-Kernel, and Linux OS in the Internet of Things (IoT)/Industrial control systems (ICS)/Distributed Control Systems (DCS)/Operational Technology (OT), and Chromebook™, the operating system of the user device(s) 104 runs third-party apps. The policy store 110 holds policies for the individual user device 104 and the mid-link server 106.

The user device(s) 104 utilize content and processing from the web server 108, including content sites such as websites, plugins, and streaming content. Under policy control, the user device(s) 104 route some interactions to the mid-link server 106, which hosts a controlled software environment for end-user(s) 102 to securely interact with the web server 108 or enterprise tools in a way limited by specified policies. For example, policies may select third-party content that is permitted to be accessed on the user device(s) 104 while using the controlled software environment by remote access. The third-party content includes websites, web applications, streaming services, browsing activities, in-app activities, online transactions, and other activities performed via third-party providers. The policies for the third-party content specify a manner in which the third-party content is to be accessed by the end-user(s) 102.

The mid-link server 106 for the work systems resides as a "man-in-the-middle". It intentionally takes over some or all, the processing, application execution, and/or content sites at the web server 108. The mid-link server 106 utilizes a deepfake detection model to identify deepfakes and AI-manipulated audios, videos, images, and documents stored on the enterprise server 112, as well as on employee hardware units such as laptops and smartphones, and in real-time communications. The remote software environment is hosted by the mid-link server 106 for a policy-controlled experience using the policy store 110 for authorization. For example, the content sites at the web server 108 may have specific applications disabled, filtered, or modified by the mid-link server 106, so that the user device(s) 104 behave differently than if they were to directly connect to the content sites of the web server 108. For example, a policy may specify access to a website based on the deepfake detection risk identified using the policy store 110.

The web server 108 includes the content sites such as websites, streaming content, live applications, meeting access, etc., to provide content to the user devices(s) 104. The web server 108 indicates the list of participants in live applications, such as enterprise meetings. The web server 108 also permits the end-user(s) 102 of the user device(s) 104 to upload and download content from the content sites. The web server 108 is in communication with the user device(s) 104 via the mid-link server 106 over the internet-connected network. In another embodiment, the deepfake detection system 100 includes one or more application servers (not shown) for providing dynamic content to the user device(s) 104.

The policy store 110 is a database that includes predefined policies for authorizing the end-user(s) 102 to access the content on the web server 108. The policy store 110 also includes the aggregated risks with the end user(s) 102 on the user device(s) 104 for using a deepfake visual and a deepfake audio. The aggregated risks are associated with the policies. The deepfake visual or the deepfake audio can be detected in static or in real-time using the deepfake detection model. The deepfake detection model is a pre-trained model consisting of a deepfake image classifier and a deepfake audio classifier, which detect deepfakes in visual data and audio data using digital fingerprints of the user's uploaded data or the participants in a live network traffic communication. The policies may be predefined by an administrator of the enterprise or an organization on the user device(s) 104. Modified policies are also stored in the policy store 110 by the administrator.

The enterprise server 112 is a secure cloud interface, a cloud server, or cloud storage provided by the enterprise for employees to access and store work-related content. The enterprise authorizes users and allows access to the enterprise server 112 at the time of joining the enterprise. The access is revoked when the user is unauthorized or leaves the enterprise. The enterprise server 112 is in communication with the policy store 110 to fetch policies for users and provide the users with access to the enterprise server 112 accordingly.

Figure 2:
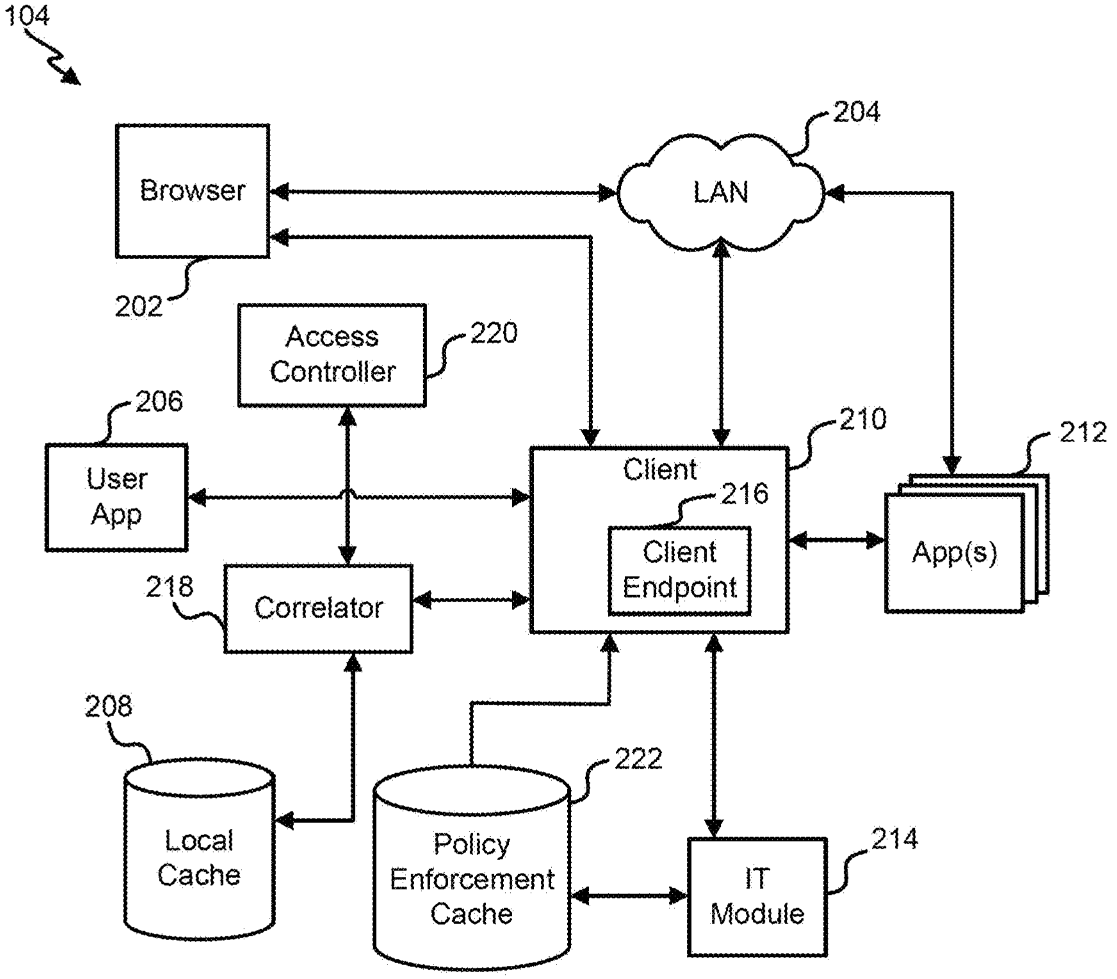
FIG. 2 illustrates a block diagram of a user device.

Referring primarily to FIG. 2, a block diagram of the user device 104 is shown. The user device(s) 104 includes a browser 202, a Local Area Network (LAN) 204, a user app 206, a local cache 208, a client 210, an app(s) 212, an Information Technology (IT) module 214, a client endpoint 216, a correlator 218, an access controller 220, and a policy enforcement cache 222. This embodiment of the user device 114 uses the client 210 to establish connections with the mid-link server 106. The user app 206 primarily uses the client 210 to communicate with the mid-link server 106, maintaining security for the operation of the user app 206.

Display of the remote software environment is performed by the user app 206. In an embodiment, the user app 206 may be a local application. The entire interface of the remote software environment can be displayed, or the interface of a single user app can be displayed. Several instances of the user app 206 could display different user app interfaces. Multiple instances of the user app 206 could have several remote software environments running. For example, a Chromebook user may have one user app running iOS and another running Linux, with the ability to switch back and forth between full-screen and windowed modes. The user app 206 is a web browser or a video player in some embodiments, displaying a real-time meeting. Policies are defined based on the aggregate risk associated with the end-user 102.

The client 210 can apply policies stored locally in the local cache 208 to the user device(s) 104. The local cache 208 is populated with policies from the policy store 110 that are relevant for the respective user device(s) 104. The client 210 supports the user app 206, app(s) 212 running on the user device(s) 104 or a browser 202 in communication with the mid-link server 106 via a Local Area Network (LAN) 204.

The IT module 214 provides an interface for administrators of end-user(s) 102 to analyze log reports of policies from alerts received from the enterprise's security administration and assign the policies to the user device(s) 104.

The client endpoint 216 tunnels the network traffic between the user device(s) 104 and the mid-link server 106 through a secure tunnel. Communication between the user device(s) 102, 104, and the mid-link server 106 occurs via the client endpoint 216. The policies are communicated from the mid-link server 106 to the local cache 208.

The correlator 218 determines corresponding policies based on an analysis from the mid-link server 106. Based on the policies, access to the live conference is provided to the end-user(s) 102. The local cache 208 performs the steps of policy determination locally and saves the time that would have been required if the policy determination had taken place at the mid-link server 106.

The access controller 220 is used to either permit or deny access to the live conference based on the policies. After the policy determination is performed at the correlator 218, the access controller 220 performs authorization or denial of access based on the policy identified by the correlator 218. The end-user(s) 102 may be either permitted access or denied access to the live conference based on the policy.

The policy enforcement cache 222 receives machine learning generated policies for the administrator from the mid-link server 106 and stores them in the policy enforcement cache 222. The policies are appended to the policies already stored in the local cache 208, and the cumulated policies are applied on the user device(s) 104 based on every single level of the deepfake detected in the live conference. The machine learning models recommend policies based on the risks associated with deepfakes, utilizing existing enterprise policies. The machine learning models use data from publicly available sources and websites to identify the risks associated with deepfakes.

Figure 3:
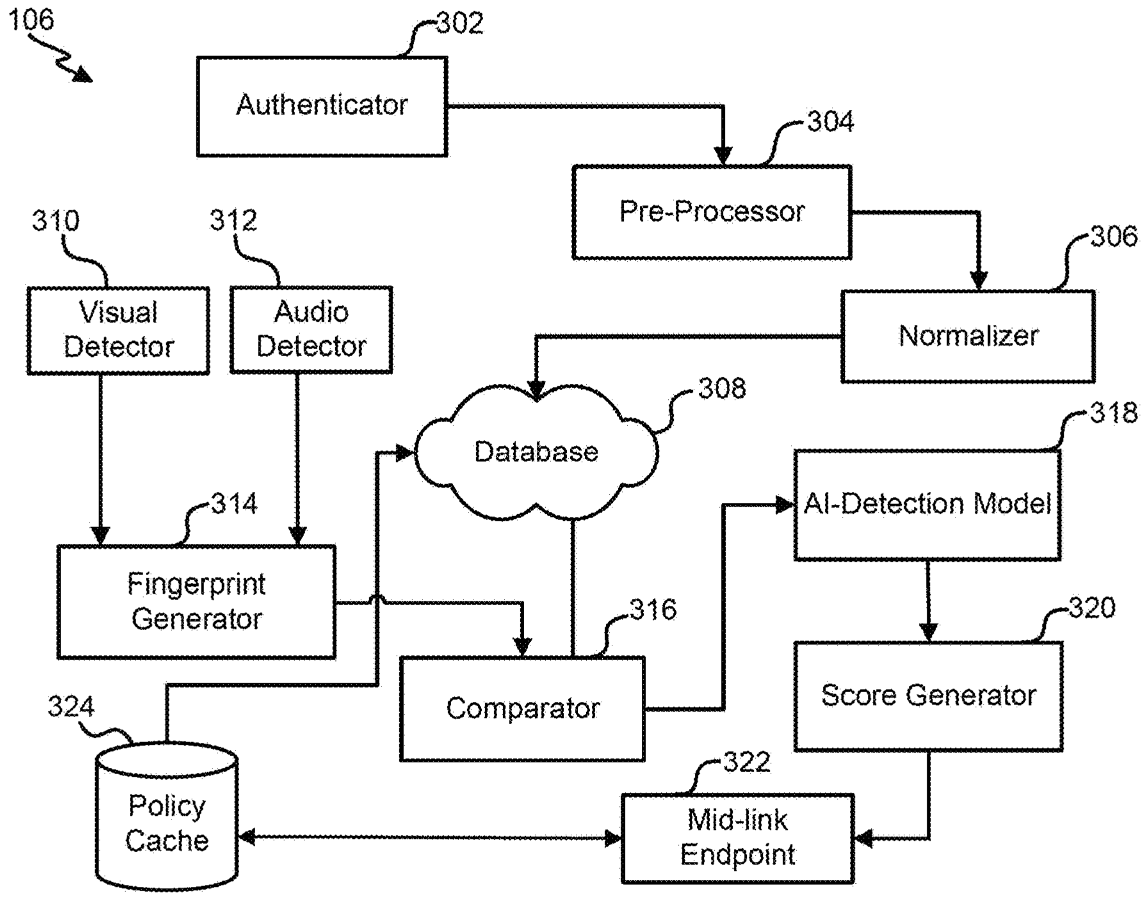
FIG. 3 illustrates a block diagram of a mid-link server.

Referring to FIG. 3, a block diagram of the mid-link server 106 that hosts software environments that the user device(s) 104 remotely access, is shown. The mid-link server 106 acts as a middleman between the user device(s) 104 and the web server 108. The mid-link server 106 detects deepfakes in stored media and real-time communications within the enterprise and applies policies and corresponding actions according to the deepfake detection The mid-link server 106 includes an authenticator 302, a pre-processor 304, a normalizer 306, a database 308, a visual detector 310, an audio detector 312, a fingerprint generator 314, a comparator 316, an Artificial Intelligence (AI)-detection model 318, a score generator 320, a mid-link endpoint 322, and a policy cache 324.

The authenticator 302 authorizes images and audio of one or more authorized employees or users of the enterprise. Additionally, the authenticator 302 receives and stores fingerprints of one or more authorized employees or users through the fingerprint generator 314. The images and audio of authorized employees are obtained when the employee joins the enterprise or during the employee's period of employment. Enterprise users securely upload images and audio recordings of employees and executives through a cloud interface on the enterprise server 112. The authenticator 302 receives raw multimedia inputs and performs image amplification using the pre-processor 304 to enhance both images and audio data streams.

The pre-processor 304 modifies the images and audio of the authorized employee. It includes image cropping and audio feature extraction that are used to extract essential features of the authorized employee. The modification is particularly beneficial in scenarios where the input data is degraded due to low-light environments, weak audio signals, or background noise. A custom-trained object detection model will enhance the authorized images. The object detection model is used for identifying and localizing objects within an image or video. The pre-processed images are sent to the normalizer 306 to match the images and audio with the fingerprints of the respective employees. The fingerprints of the enterprise's employees are generated and stored in the database 308.

The normalizer 306 processes the modified images and video, performing normalization on the images and audio of every authorized user. Normalization is a process of matching the images and audio with a unique identifier, such as fingerprints. The normalizer 306 matches the images and audio of every authorized employee with a generated fingerprint and stores these as normalized fingerprints. The unique identities of individuals, such as their normalized fingerprints, are pre-stored in the database 308 when authorized users join the enterprise. The authorized users are the employees of the enterprise whom the enterprise has previously approved.

The database 308 secures and stores the normalized fingerprints of the authorized users. The normalized fingerprints are stored in the cloud, such as an enterprise-secure cloud. Fingerprints are stored primarily, without storing images/videos, and audio in the database 308, to avoid privacy issues for the employees of the enterprise. Data in the database 308 is stored as a hash, and the original media is deleted to ensure security.

The visual detector 310 extracts a visual data from videos uploaded by the enterprise's employees. The visual detector 310 performs detection of visual characteristics of the users to extract the visual data. The visual characteristics can include images, videos, and other visual elements. The visual detector 310 is connected to the web server 108 to identify visual characteristics of participants in a meeting conducted on the web server 108. In one embodiment, the visual detector 310 detects videos of participants in a meeting held by the web server 108. In another embodiment, the visual detector 310 detects images/videos of a static data. The static data of the enterprise includes documents and videos uploaded by employees on physical media, such as laptops, desktops, smartphones, or the enterprise server 112.

The audio detector 312 extracts audio from the videos uploaded by the employees of the enterprise. In one embodiment, the audio detector 312 also extracts live audio from live network traffic communications, such as meetings within the enterprise. The sessions can be conducted on platforms like Zoom, Microsoft Teams, Google Meet, and similar platforms. A plugin enables continuous monitoring of live communications to extract live audio of the participants/users of the meeting. An Application Programming Interface (API) may also be used in conjunction with a plugin. The audio detector 312 and the visual detector 310 are connected to the fingerprint generator 314, which produces fingerprints based on the detected visual data and audio data of the users.

The fingerprint generator 314 generates digital fingerprints from the visual and audio data of documents and videos uploaded by the employees of the enterprise. In one embodiment, the fingerprint generator 314 generates digital fingerprints from the visual data and the audio data extracted from a live communication. The visual data and the audio data are monitored in real-time during live communication using the plugin and APIs. The digital fingerprints serve as unique identifiers to detect whether the visual data and the audio data are deepfakes or not.

The comparator 316 compares the digital fingerprints generated from the visual data and the audio data of the documents uploaded by the enterprise's employees with the stored, normalized fingerprints of the authorized users. The comparator 316 determines if any mismatch occurs by comparing the generated digital fingerprints and stored fingerprints to verify employee identity. The comparator 316 matches the generated digital fingerprints with the stored fingerprints and provides an output of the match to the AI-detection model 318 and the score generator 320. The comparator 316 also flags mismatches for further analysis by the AI-detection model 318. The AI-detection model 318 detects synthetic media artifacts and AI-manipulated media.

The AI-detection model 318 is a Convolutional Neural Network (CNN)-based deepfake detection model. The AI-detection model 318 analyzes visual and audio data for synthetic artifacts. The AI-detection model analyzes the visual and audio data and flags suspicious media if synthetic artifacts are detected. The AI-detection model 318 is a custom-trained Convolutional Neural Network (CNN) based on ConvNeXt XXL, an extensive network of ~850 million parameters that utilizes computational elements borrowed from state-of-the-art vision transformers. ConvNeXt is a modern CNN architecture that reimagines classic CNNs by integrating successful design elements from the vision transformers.

The AI-detection model 318 includes various machine learning techniques apart from the CNN-based deepfake detection model. The machine learning models identify deepfakes based on risks associated with the visual and the audio, which are deemed suspicious. A level of deepfake is identified based on the risks associated with the deepfake in the visual and the audio. The risks are determined based on publicly available data and websites. The machine learning models use a set of deepfake cases as a training set to identify the level of deepfakes in the media. The level of deepfake is provided as the output by the machine learning models to the score generator 320.

The score generator 320 calculates a deepfake detection score based on the analysis of the AI-detection model 318 and the output from the comparator 316. The deepfake detection score generated by the score generator 320 is used to create user-level alerts for the user device(s) 104 based on the deepfake detection. The deepfake detection is determined by comparing the deepfake detection score with a predefined threshold score set by the enterprise administration. The digital fingerprint mismatch and the deepfake detection score are combined to determine the level of deepfake. Policies are applied based on the level of deepfake.

The threshold score can be a numerical value ranging from 0-100. Based on the level of deepfake, policies are applied in real-time. For example, suppose the deepfake detection score exceeds 60. In that case, the deepfake is categorized as high risk, and the policies are applied to the user device(s) 104 accordingly, for example, access to the enterprise server 112, specific websites, software, or data storage of the enterprise is blocked. Suppose the deepfake detection score is less than 50. In that case, the deepfake is categorized as medium risk, and the policies are applied to the user device(s) 104 accordingly, for example, access to the enterprise server 112, specific websites, software, or data storage of the enterprise is partially blocked. If the deepfake detection score is less than 20, the deepfake is categorized as low risk, and the policies are applied to the user device(s) accordingly, for example, no change in access. The score generator 320 is connected to the mid-link endpoint 322, which generates alerts and applies policies from the policy store 110 based on the alerts on the web server 108.

The policy cache 324 is in communication with the policy store 110. The policies are pre-defined in the policy store 110 by the enterprise. The policies are set based on the user role, location, User Entity Behavior Analytics (UEBA), profile, demands, time, etc. The policies include actions to be taken on users when the deepfake is detected, as shown in Table 1 and Table 2. The actions blocking users, permitting users, partially blocking users, etc. The policy cache 324 extracts the policies corresponding to the deepfake detection from the policy store 110, and the mid-link endpoint 322 applies policies from the policy cache 324 to the user device(s) 104.

TABLE 1

| Deepfake level | Policies |
|---|---|
| Fingerprint mismatch flag | Further identity verification may be required, access to the participant/user is held until verification is complete |
| Deepfake machine learning flag | Reauthorize the user |
| Fingerprint mismatch flag and deepfake machine learning flag | Block the access to the user/participant of the enterprise |
| No flags are triggered | Access continues |

TABLE 2

| Policies | User role | Deepfake level |
|---|---|---|
| Block access and contact the user/participant immediately | Senior Management | Fingerprint mismatch flag |
| Block access and contact the user/participant immediately | | Deepfake machine learning flag |
| Block access and contact the user/participant immediately | | Fingerprint mismatch flag and deepfake machine learning flag |
| Hold access and re-authenticate | Trainee | Fingerprint mismatch flag |
| Hold access until the administrator contacts the user | | Deepfake machine learning flag |
| Block the user access and give an alert to the user device and the administration of the enterprise | | Fingerprint mismatch flag and deepfake machine learning flag |

Figure 4:
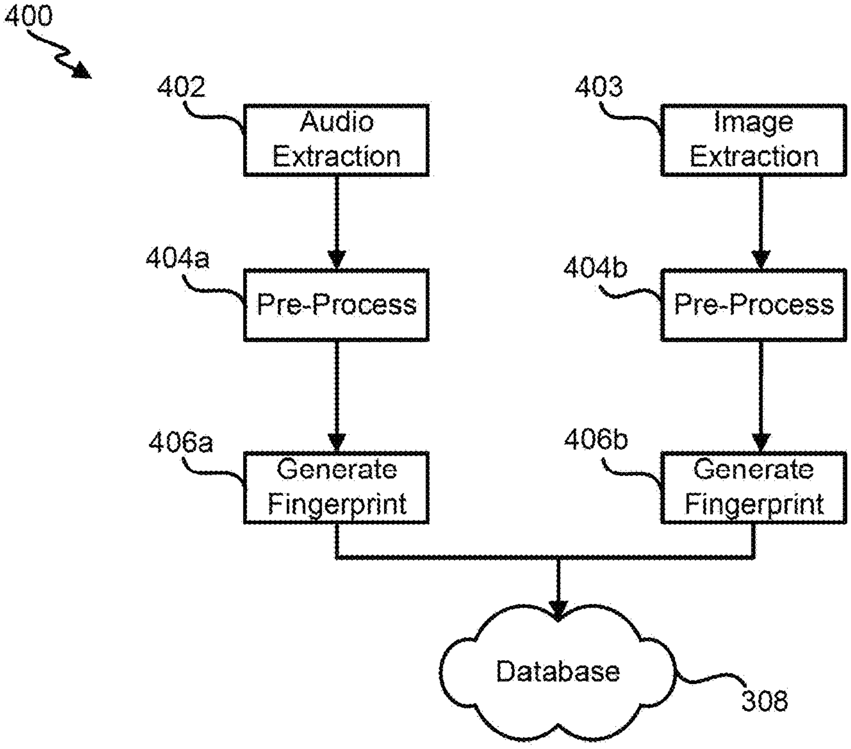
FIG. 4 illustrates a block diagram representing a process of extraction of data collection and fingerprint generation of an employee of an enterprise.

Referring to FIG. 4, a block diagram illustrates the process 400 of data collection and fingerprint generation for the user of the enterprise. The process 400 includes audio extraction 402, image extraction 403, pre-process 404*a*, 404*b*, generate fingerprint 406*a*, 406*b*, and storage in the database 308.

The audio extraction 402 and the image extraction 403 include extracting images and audio recordings of the employees/users and executives of the enterprise from a cloud interface or the enterprise server 112. Enterprise users securely upload images and audio recordings of employees and executives on the cloud interface. For uploading images and audio recordings of high quality, the authenticator 302 ensures high-resolution images and clear audio recordings. The employees and the executives are authenticated users of the enterprise.

At block 404*a*, the extracted audio undergoes pre-processing. The audio recordings are taken as voice samples. The voice samples are segmented into key audio characteristics with respect to each of the employees and the executives of the enterprise.

At block 404*b*, the extracted images undergo pre-processing. The faces of the employees and the executives are detected from the images. The images of detected faces are cropped using a custom-trained object detection model. The cropped images are then resized by using a resampling technique for inputting the cropped images into a deepfake classifier. The deepfake classifier determines whether the images are deepfakes or not. In an embodiment, the images are resized to a 256×256 pixel image.

At blocks 406*a* and 406*b*, the fingerprints are generated by the fingerprint generator 314. Fingerprints are the unique identifiers of an individual employee and the executives of the enterprise that are generated for individual image and audio samples from the blocks 404*b* and 404*a*, respectively. The fingerprint generator 314 generates fingerprints using a hybrid approach, such as hashing and deep learning embedding. The hybrid approach, such as hashing, converts the fingerprints into a fixed-size code for fast storage and comparison, without preserving similarity, and sometimes represents fingerprints as learned dense vectors that capture similarity, thereby enabling more accurate matching. The generated fingerprints are normalized using the normalizer 306, and the normalized fingerprints are stored in the database 308.

Figure 5:
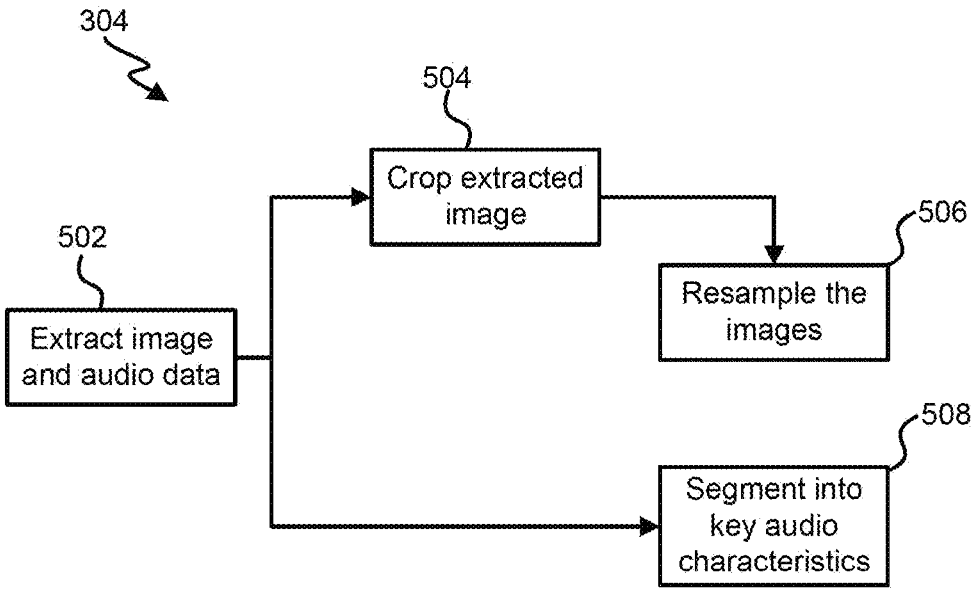
FIG. 5 illustrates a block diagram of a pre-processor.

Referring to FIG. 5, a block diagram of the pre-processor 304 of visual and audio data. The pre-processor 304 performs pre-processing on the extracted images and audio of the employees of the enterprise. The pre-processing includes extracting images and audio data, cropping the extracted image, resampling the images, and segmenting audio data into key audio characteristics. An enterprise user uploads data on the enterprise server 112 or stores the data on hardware provided by the enterprise, such as the user device(s) 104. The user device(s) 104 are the PC, the laptop, the smartphone, or the tablet.

At block 502, images and audio are extracted from data uploaded by the enterprise user. At block 504, the extracted image is cropped to identify the facial characteristics. The extracted images are cropped for an accurate identification of the face. At block 506, the cropped images are resampled to enhance the recognition of facial characteristics.

At block 508, the audio recordings are segmented into key audio characteristics for an individual employee of the enterprise. The pre-processed images and audio are used to generate fingerprints for identifying each employee of the enterprise.

Figure 6:
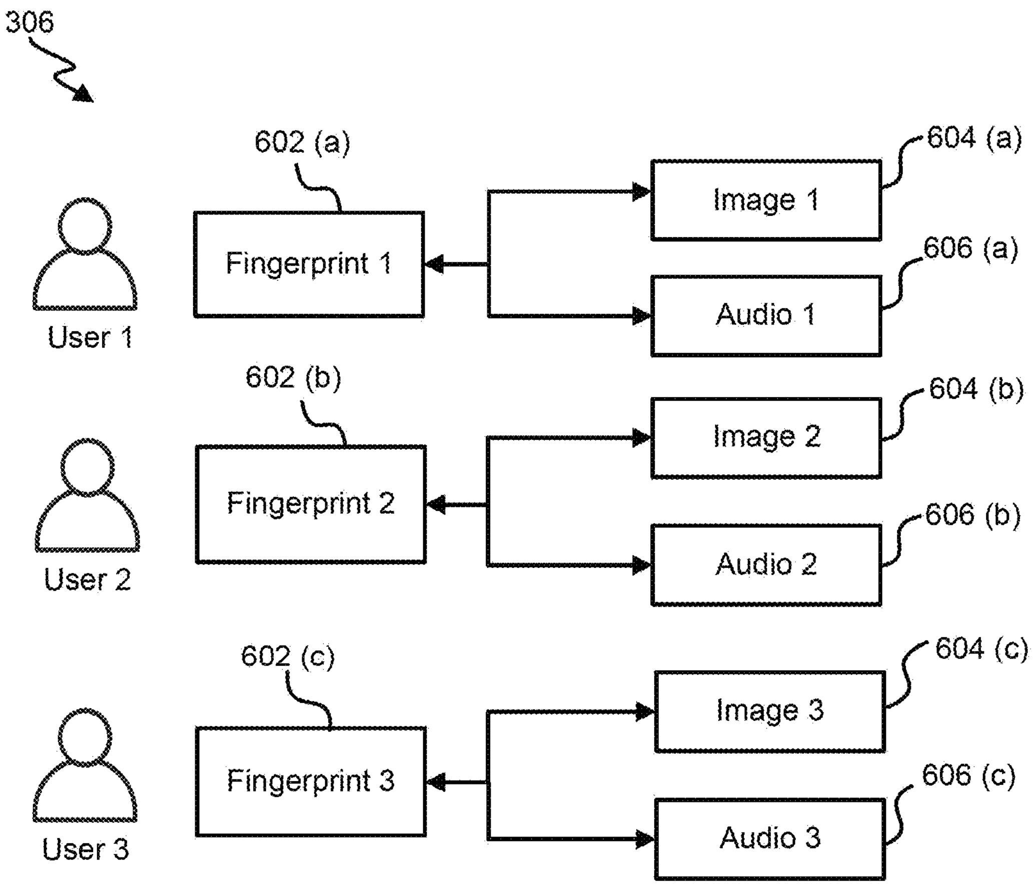
FIG. 6 illustrates a block diagram of a normalizer.

Referring to FIG. 6, a block diagram of the normalizer 306 is shown. The normalizer 306 matches the fingerprint of every single user with the image and audio of the respective user. The normalization is done to store the unique identity of every single user with the image and the audio of the respective user in a cloud database (not shown) or the policy store 110. The normalizer 306 includes processing fingerprints 602 (*a*), 602 (*b*), 602 (*c*), images 604 (*a*), 604 (*b*), 604 (*c*), and audios 606 (*a*), 606 (*b*), 606 (*c*).

The normalizer 306 matches the fingerprint 602 of every single user with the image 604 and audio 606 of every single user and stores the normalized fingerprints in the database 308 as a hash. For example, the fingerprint 602 (*a*) is generated for a person named John. Now the fingerprint of John is matched with the image and audio of John. This represents the unique identifiers of John, which are tied to the visual and audio characteristics of John.

The fingerprint 1 matches image 1 and audio 1 of user 1. Similarly, fingerprint 2 matches image 2, and audio 2 of user 2, and fingerprint 3 matches image 3, and audio 3 of user 3.

Figure 7:
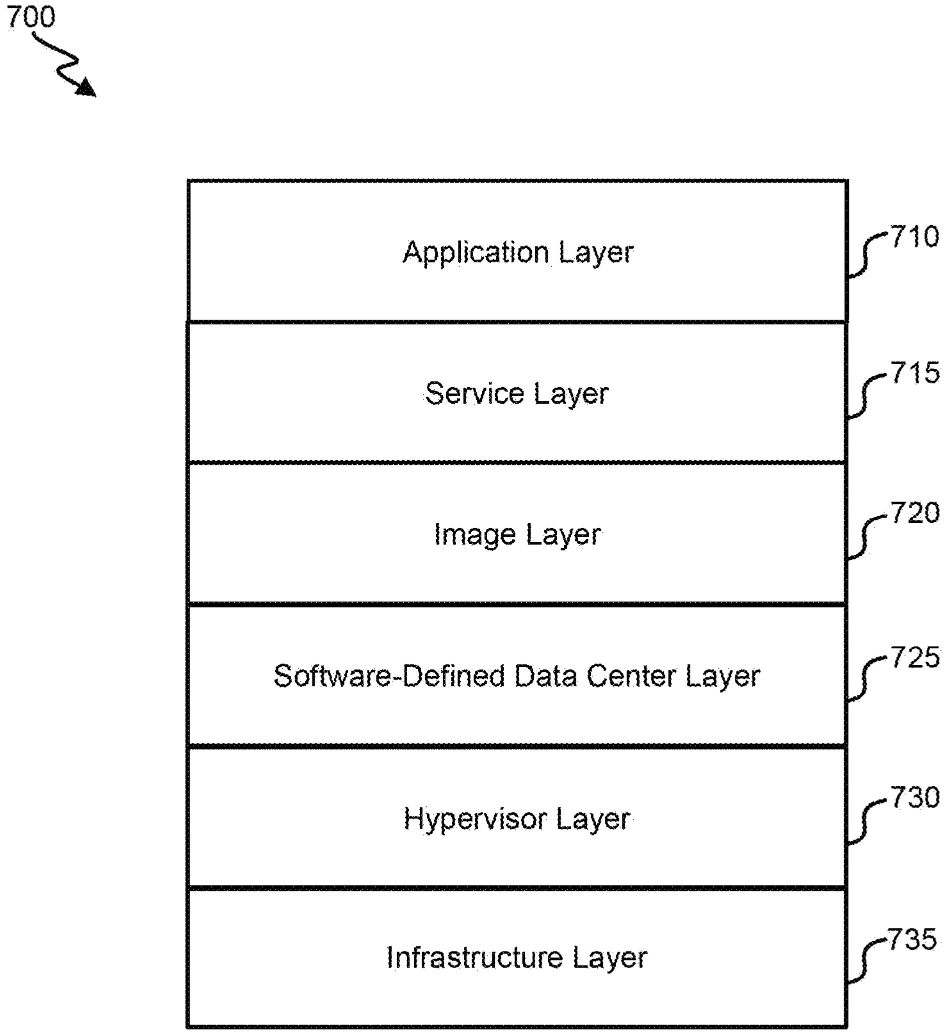
FIG. 7 illustrates a block diagram of an embodiment of a cloud Open Systems Interconnection (OSI) model for cloud computing environments for applying policies through a mid-link server.

Referring to FIG. 7, a block diagram of an embodiment of a cloud Open Systems Interconnection (OSI) model 700 for computing environments for applying policies through a mid-link server is shown. The cloud OSI model 700 for cloud computing environments partitions the flow of data in a communication system into six layers of abstraction. The cloud OSI model 700 for cloud computing environments can include, in order, an application layer 710, a service layer 715, an image layer 720, a software-defined data center layer 725, a hypervisor layer 730, and an infrastructure layer 735. The respective layer serves a class of functionality to the layer above it and is served by the layer below it. Classes of functionality can be realized in software by various communication protocols.

The infrastructure layer 735 can include hardware, such as physical devices in a data center, that provides the foundation for the rest of the layers. The infrastructure layer 735 can transmit and receive unstructured raw data between a device and a physical transmission medium. For example, the infrastructure layer 735 can convert the digital bits into electrical, radio, or optical signals.

The hypervisor layer 730 can perform virtualization, which permits physical devices to be divided into virtual machines that can be packed onto physical machines for greater efficiency. The hypervisor layer 730 can provide virtualized computing, storage, and networking. For example, OpenStack® software that is installed on bare metal servers in a data center can provide virtualization cloud capabilities. The OpenStack® software can provide various infrastructure management capabilities to cloud operators and administrators. It can utilize Infrastructure-as-Code concept for deployment and lifecycle management of a cloud data center. In the Infrastructure-as-Code concept, the infrastructure elements are described in definition files. Changes in the files are reflected in the configuration of data center hosts and cloud services.

The software-defined data center layer 725 can provide resource pooling, usage tracking, and governance on top of the hypervisor layer 730. The software-defined data center layer 725 can enable the creation of virtualization for the Infrastructure-as-Code concept by using representational state transfer (REST) APIs. The management of block storage devices can be virtualized, and end-users can be provided with a self-service API to request and consume those resources, which do not entail any knowledge of where the storage is deployed or on what type of device. Various compute nodes can be balanced for storage.

The image layer 720 can utilize various operating systems and other pre-installed software components. Patch management can be used to identify, acquire, install, and/or verify patches for products and systems. Patches can be used to correct security and functionality problems in software. Patches can also be used to add new features to operating systems, including security capabilities. The image layer 720 can focus on the compute in place of storage and networking. The instances within the cloud computing environments can be provided at the image layer 720.

The service layer 715 can provide middleware, such as functional components that applications use in tiers. In some examples, the middleware components can include databases, load balancers, web servers, message queues, email services, or other notification methods. The middleware components can be defined at the service layer 715 on top of particular images from the image layer 720. Different cloud computing environment providers can have different middleware components.

The application layer 710 may interact with the mid-link server 106 to apply policies from the policy store 110. The application layer 710 is the layer that is closest to the end-user(s) 102. It permits the identification of the routing information of the network traffic and the determination of a secure tunnel for providing access to the data. The application layer 710 allows the determination of the tunnel for establishing the network connection. Functions of the application layer 710 may include identifying communication partners, determining resource availability, and/or synchronizing communication. Applications within the application layer 710 may include custom code that makes use of middleware defined in the service layer 715.

Various features discussed above can be performed at one or more layers of the cloud OSI model 700 for cloud computing environments. For example, translating the general policies into specific policies for different cloud computing environments can be performed at the service layer 715 and the software-defined data center layer 725. Various scripts can be updated across the service layer 715, the image layer 720, and the software-defined data center layer 725. Furthermore, APIs and policies can operate at the software-defined data centre layer 725 and the hypervisor layer 730.

Respective different cloud computing environments can have different service layers 715, image layers 720, software-defined data center layer 725, hypervisor layer 730, and infrastructure layer 735. Further, different cloud computing environments can have an application layer 710 that can make calls to the specific policies in the service layer 715 and the software-defined data center layer 725. The application layer 710 can have a noticeably similar format and operation across different cloud computing environments. Accordingly, developers for the application layer 710 do not need to understand the peculiarities of how respective cloud computing environments operate in the other layers.

Figure 8:
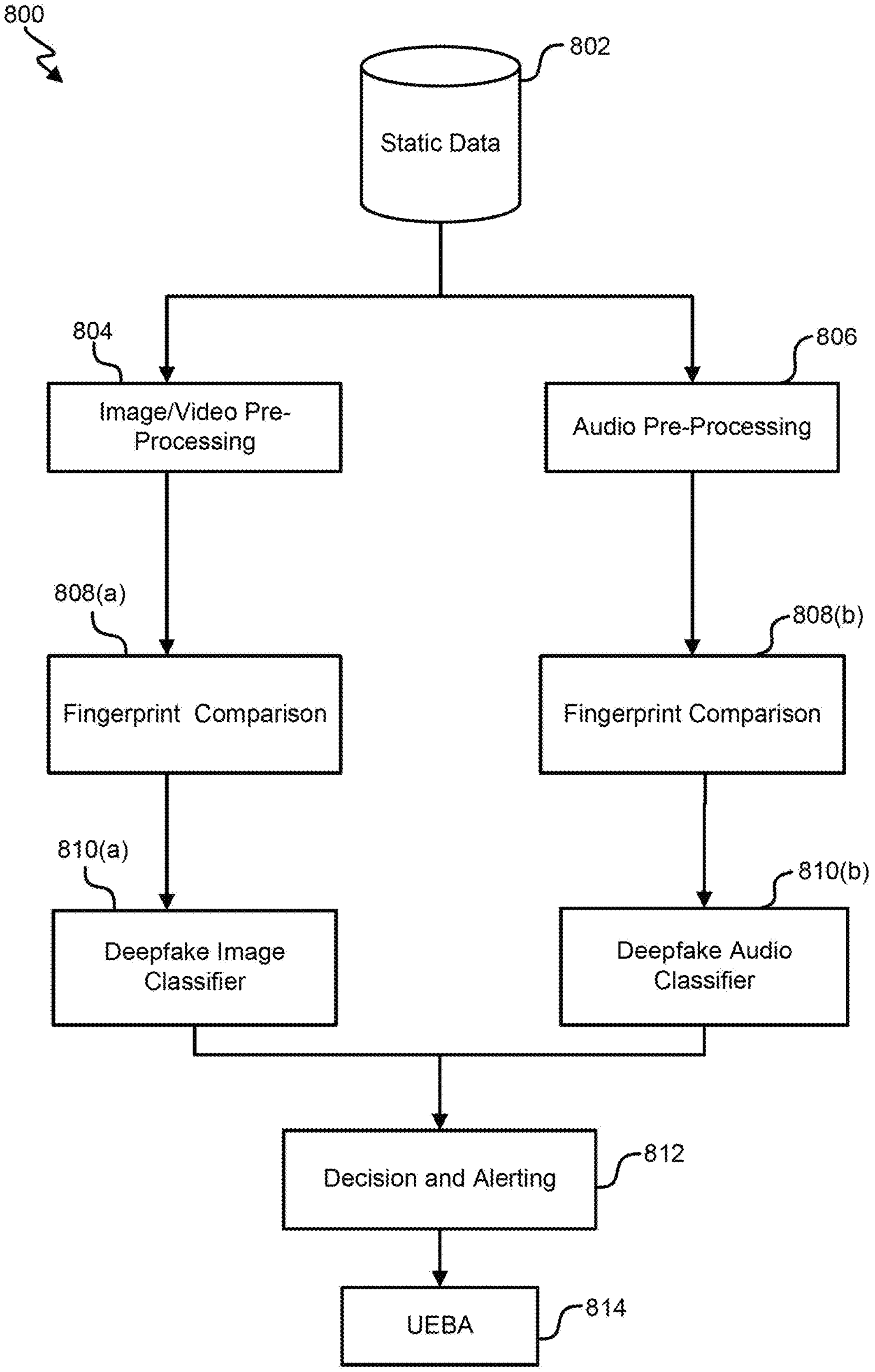
FIG. 8 illustrates a block diagram of a deepfake detection system for deepfake detection in enterprise data at rest.

Referring to FIG. 8, a block diagram 800 of a deepfake detection system 100 for deepfake detection in enterprise data at rest is shown. Enterprise data refers to the information of a user within the enterprise. The data may be uploaded on the enterprise server 112 by the user or stored in a physical medium provided by the enterprise to the user. The data is static data 802. The static data 802 is the data at rest. The data includes documents, files, images, recordings, and videos uploaded by the employees/authenticated users of the enterprise. These authenticated users have access to upload documents/videos in the database 308 of the enterprise or the enterprise server 112. Here, the documents and videos are referred to as the static data, as they are the original documents that the authenticated users of the enterprise directly upload.

At block 804, images are extracted from documents and videos uploaded by authenticated users of the enterprise. The extracted images undergo pre-processing before fingerprints are generated. Fingerprints are used to capture the unique identity of each user. The extracted images are cropped and resampled using the pre-processor 304 to yield high-quality images. In another embodiment, the deepfake detection system 100 uses contextual metadata such as filenames, document text, and other information to infer potential identities of each user, uploading the documents and videos on the enterprise server 112.

At block 806, the audio recordings are extracted from each of the documents and videos uploaded by the authenticated users of the enterprise. The audio recordings undergo pre-processing before being converted into fingerprints to store the unique identity of each user. In one example, pre-processing of the audio recordings includes extracting one or more audio features from the audio recordings. The extracted audio recordings of each user are segmented into key audio characteristics by the pre-processor 304. In another embodiment, the deepfake detection system 100 uses contextual metadata, such as filenames, document text, etc., to infer potential identities of each user, uploading the documents and videos on the enterprise server 112.

At blocks 808 (*a*) and 808 (*b*), digital fingerprints are generated from the pre-processed images and audio recordings by the fingerprint generator 314. The generated digital fingerprints are compared with the pre-stored fingerprints of the authorized users of the enterprise by the comparator 316. Based on the comparison by the comparator 316, the deepfake detection system 100 flags mismatches if any discrepancies are identified when comparing the generated digital fingerprint and the pre-stored fingerprint. The mismatches are sent to deepfake detection models for further analysis. The pre-stored fingerprints are stored in a repository of the enterprise server 112. In case there is no mismatch, the process repeats.

At block 810 (*a*) and 810 (*b*), deepfake documents and videos are detected by deepfake detection models when the deepfake detection system 100 identifies mismatches and flags the mismatches to the user and the administrator of the enterprise. The deepfake detection models are CNN-based and used to analyze images and audio of the uploaded documents and videos for synthetic artifacts. On analysis by the deepfake detection models, the deepfake detection score is calculated by the score generator 320 to identify the level of deepfake involved in the documents and the videos.

At block 812, the final decision is taken based on a first-level and a second-level deepfake. The first-level includes a decision based on matching the generated digital fingerprints with the pre-stored fingerprints of the authorized users. The second-level includes a decision based on a score calculated by analyzing by the deepfake detection model. The deepfake detection system 100 combines two flags of the two levels, such as a fingerprint mismatch flag of the first level deepfake and a deepfake machine learning flag of the second-level. The final decision is based on decision criteria that depend on the fingerprints mismatch flag and the deepfake machine learning flag. The decision criteria are as follows:

- If both the fingerprint mismatch flag and the deepfake machine learning flag are triggered, the media is highly likely to be a deepfake.

If the deepfake machine learning flag alone is triggered, the documents and videos uploaded by the users are labelled as "suspicious" for further review.

If the fingerprint mismatch flag alone is triggered, further identity verification may be required.

If fingerprints generated are not matched with any of the data from the pre-stored fingerprints of authorized employees, the deepfake detection system 100 will solely rely on the deepfake detection models for identifying the deepfake.

At block 814, the deepfake detection score generated by the score generator 320 based on the analysis of the deepfake detection model is input into a User Entity Behavior Analytics (UEBA). The UEBA generates user-level alerts based on the level of deepfakes identified in documents and videos uploaded by the enterprise's employees.

Figure 9:
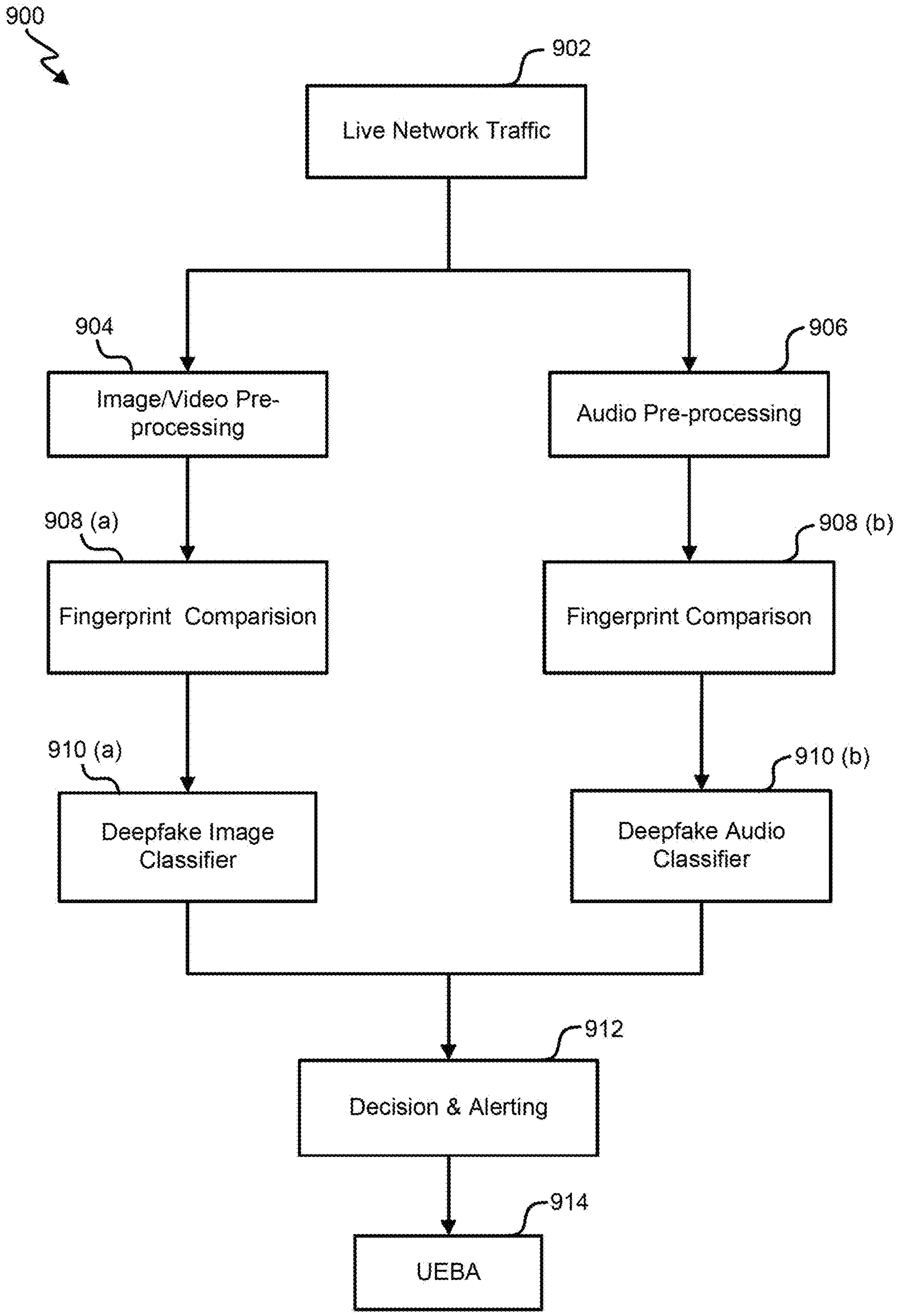
FIG. 9 illustrates a block diagram of a deepfake detection system for deepfake detection in real-time network traffic.

Referring to FIG. 9, a block diagram 900 of the deepfake detection system 100 for deepfake detection in real-time network traffic is shown. Live network traffic 902 between users of an enterprise is processed by the deepfake detection system 100. The plugin enables continuous monitoring of live network traffic of meetings and video conferencing platforms such as Zoom™, Microsoft Teams™, Google Meet™, etc. The real-time network traffic includes videos and audio of the participants/users attending the video conference. The real-time network traffic is a live recording of the videos and audio of the participants in the video conference. The list of participants attending the meeting is available on the web server 108.

At block 904, the videos and audios of the participants attending the video conference are extracted from the live network traffic 902 on the web server 108 by the pre-processor 304. The live network traffic includes the video stream of the participants participating in the video conference. Key video frames and live audio of the participants are extracted from the live video stream of the video conference. Images are generated from the key video frames for each participant in the video conference.

At block 906, the audios of the participants attending the video conference are extracted from the live network traffic 902 on the web server 108 by the pre-processor 304. The live network traffic comprises the video stream of the participants joining the video conference. Live audio of the participants is extracted from the live video stream of the video conference. The deepfake detection system 100 analyzes the audio and videos of the participants in the live conference. The participants are identified from the list of attendees at the meetings using the attendee lists and in-meeting metadata from the video conference.

At block 908 (*a*) and 908 (*b*), digital fingerprints are generated from the pre-processed videos and audio of the live conference by the fingerprint generator 314. The generated fingerprints are compared with the pre-stored fingerprints of the authorized users of the enterprise by the comparator 316. On comparing, the deepfake detection system 100 triggers a fingerprint mismatch flag if any mismatch occurs in comparing the generated digital fingerprint and the pre-stored fingerprint for inconsistencies. The mismatches are sent to the deepfake detection model for further analysis. The pre-stored fingerprints are stored in a repository of the enterprise server 112. In case there is no mismatch, the process repeats.

At block 910 (*a*) and 910 (*b*), deepfake videos and audio of the live conference are detected by deepfake detection models when the deepfake detection system 100 triggers a fingerprint mismatch flag to the user and the administrator of the enterprise. The deepfake detection models are CNN-based models. The deepfake detection models analyze images and audio from live video conference streams for synthetic artifacts. If the images and audio from the videos of the live conference are detected as deepfakes, the deepfake detection system 100 flags suspicious media. Upon analyzing the documents and videos using deepfake detection models, a deepfake detection score is calculated by the score generator 320 to identify the level of deepfake involvement in the media.

At block 912, the final decision is taken based on a first-level and a second-level deepfake. The first-level includes a decision based on matching the generated digital fingerprints with the pre-stored fingerprints of the authorized users. The second-level includes a decision based on a score calculated by analyzing the deepfake detection models. The deepfake detection system 100 combines two flags of the two levels, such as a fingerprint mismatch flag of the first-level deepfake and a deepfake machine learning flag of the second-level. The fingerprint mismatch flag is triggered when the generated fingerprints do not match the normalized fingerprints. The deepfake machine learning flag is triggered when the deepfake detection score exceeds the threshold pre-defined by the enterprise. The final decision is based on decision criteria that depend on the fingerprint mismatch flag and the deepfake machine learning flag. The decision criteria are as follows:

If both the fingerprint mismatch flag and the deepfake machine learning flag are triggered, the media is highly likely to be a deepfake.

If the deepfake machine learning flag alone is triggered, the documents and videos uploaded by the users are labelled as "suspicious" for further review.

If the fingerprint mismatch flag alone is triggered, further identity verification may be required.

If fingerprints generated are not matched with any of the data from the pre-stored fingerprints of authorized employees, the deepfake detection system 100 will solely rely on the deepfake detection models for identifying the deepfake.

Based on the decision criteria, when the deepfake media is identified, security alerts are generated by the enterprise. The enterprise can take real-time action, such as flagging the participant or requesting identity verification for the participant whose videos and audio are identified as deepfakes.

At block 914, the deepfake detection score generated by the score generator 320, based on the analysis of the deepfake detection model and fingerprint mismatches, is input into UEBA. The UEBA generates user-level alerts based on the level of deepfakes identified in the live communications of the enterprise's video conference.

Figure 10:
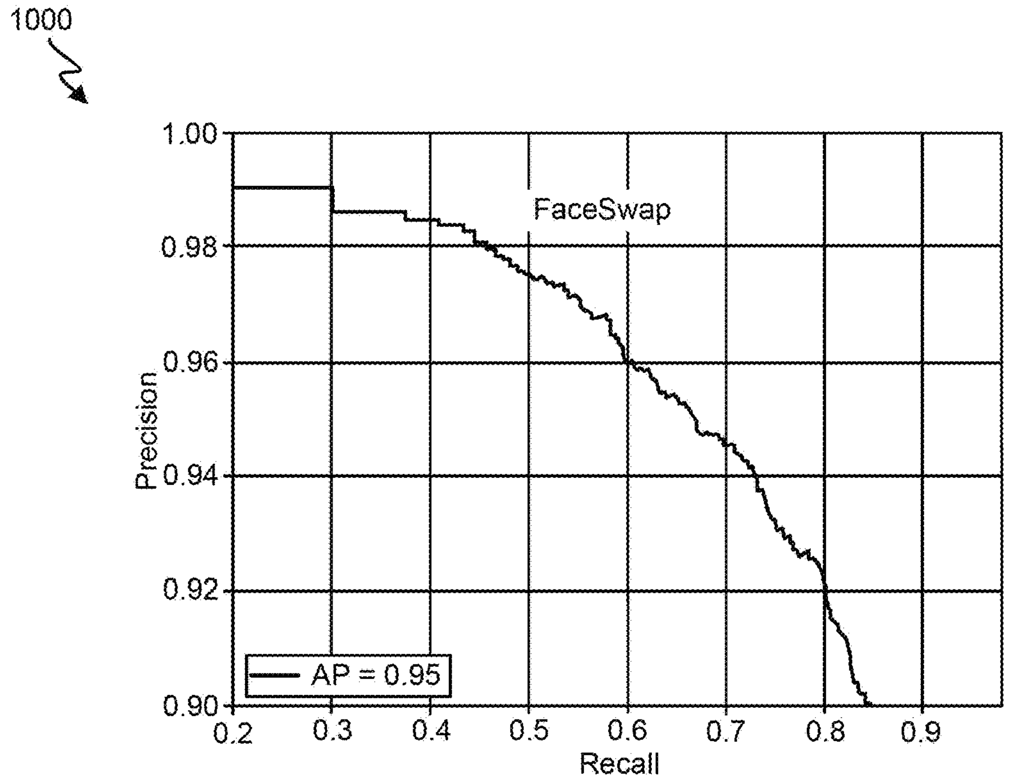
FIG. 10 illustrates a precision recall curve of a deepfake detection model predicting on a test set.

Referring to FIG. 10, a precision recall curve of the deepfake detection model predicting on a test set. The deepfake detection model includes a deepfake image classifier and a deepfake audio classifier.

The deepfake image classifier is designed to detect AI-manipulated images. The deepfake image classifier has been trained on a proprietary state-of-the-art face swap image data. The recent state-of-the-art deepfake face swaps are created using a combination of InsightFace™ and Stable Diffusion™ to create extremely realistic deepfakes. Currently, there are no publicly available datasets that were created using this state-of-the-art process. For that reason, customized face swap datasets are created using these state-of-the-art methods. Other deepfake detection solutions, which rely on public datasets for training, may struggle to detect the latest deepfake face swap images.

Another advantage of the solution provided by the deepfake detection system 100 is precisely avoiding data contamination during training and testing. Many of the publicly available deepfake datasets suffer from data contamination. For example, faces belonging to the same person may be present in the training set as positively labelled fake samples, and then again in the test set, a different face image from the same person may be present as a positive fake test sample. This may compromise the training and testing of any model using the dataset, as such a model may perform well on the test set by memorizing which faces were fake in the training set, instead of being able to actually detect deepfakes. Other deepfake detection solutions that rely on public datasets for training may suffer from inflated test performance results if they were trained and tested on datasets containing contamination. To avoid such data contamination, a facial recognition algorithm is used to fingerprint every person in the dataset. It is ensured that no more than one face per person is used across the entire dataset. This eliminates the possibility of the trained model memorizing a particular person's faces, in place of detecting deepfakes.

To detect face-swapped images, the presence of faces is first detected in an image, and then every single face is cropped. Each face is subsequently run through the deepfake classifier. To detect faces in an image, a custom object detection model is trained and fine-tuned to detect and crop faces. The deepfake detection classifier is a custom-trained Convolutional Neural Network (CNN)-based on ConvNeXt XXL, a large network of ~850 M parameters, which uses computational elements borrowed from state-of-the-art Vision Transformers.

The dataset used for training the deepfake audio classifier model consists of two classes of audio:

- Real Human Voice: Authentic recordings of human speech from diverse speakers, with varying ages, accents, and speaking styles.
- Synthetic Audio: Audio generated using voice conversion technologies (Retrieval-based Voice Conversion Model) that converts one person's voice to another while retaining the same transcript. These samples represent highly realistic deepfake audio.

The trained CNN model demonstrated improved performance with higher detection of true positive rates and lower false positives. For example, True Positive Rate (Detection Rate): 80%—the model correctly identified 80% of the synthetic audio samples.

False Positive Rate: 0.1%—the model incorrectly flagged merely 0.1% of real human voice samples as fake.

Figure 11:
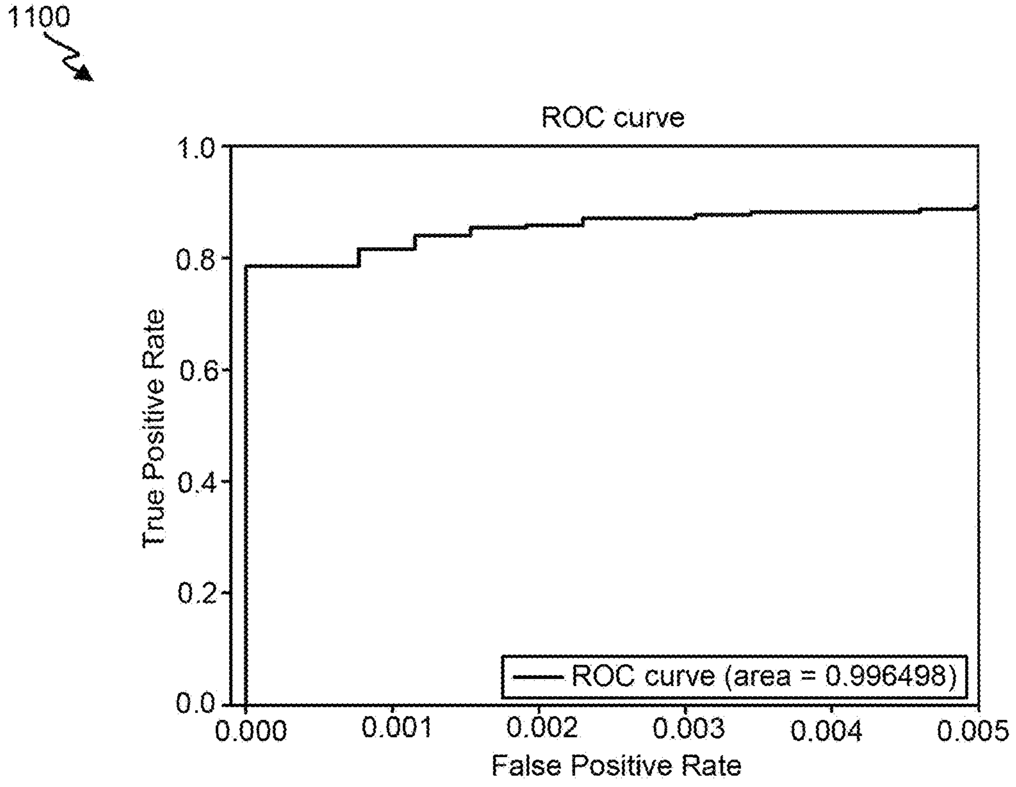
FIG. 11 illustrates the result of the performance of a trained Convolutional Neural Network (CNN) model.

Referring to FIG. 11, the results of the trained CNN model are shown in form of a graph 1100. The results indicate that the deepfake detection model works well in distinguishing fake audio while minimizing false alarms, which is crucial in real-world applications where false positives can undermine trust in legitimate content as shown in the curve of the graph 1100.

Figure 12:
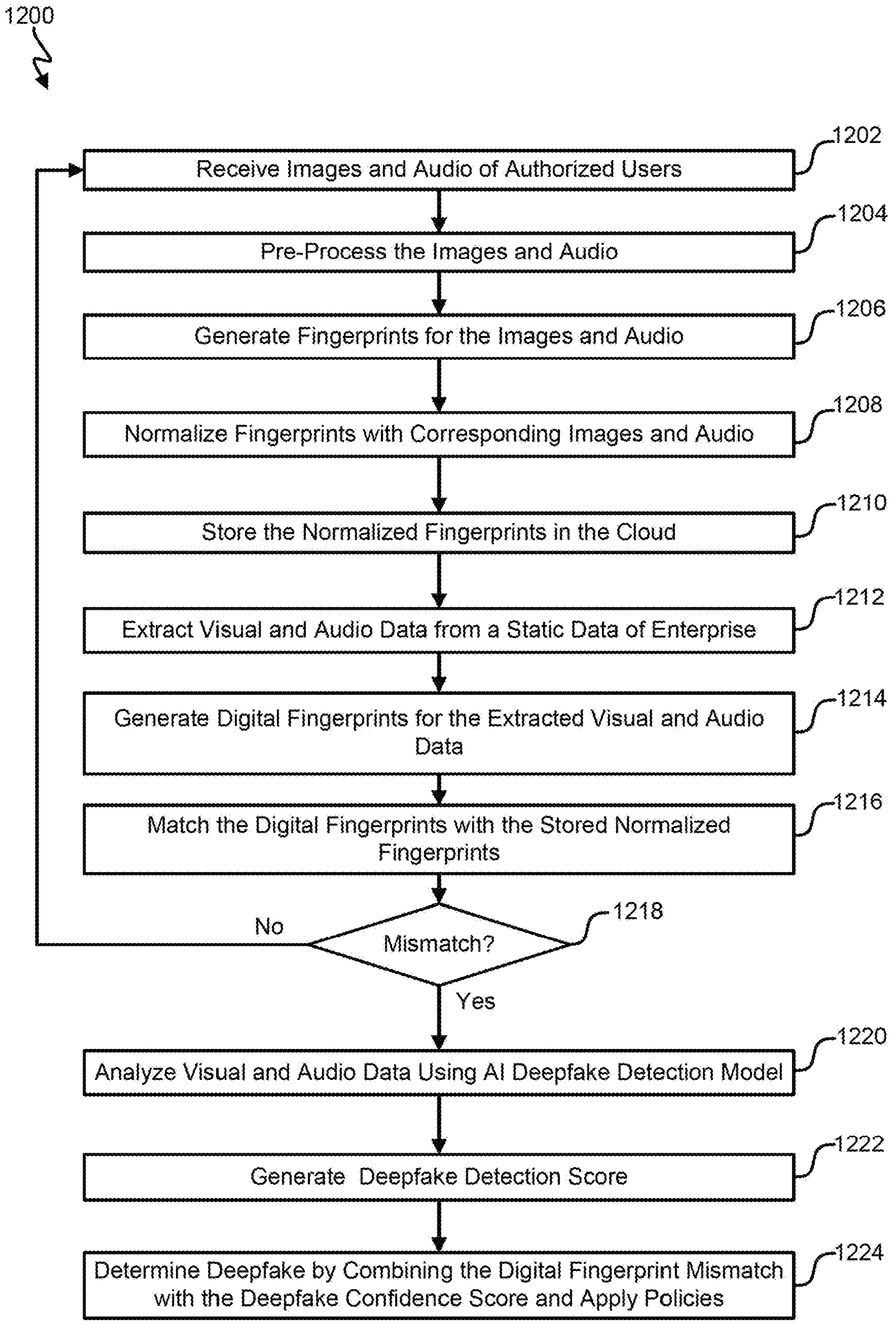
FIG. 12 illustrates a flowchart of an embodiment of detecting deepfake media in media at rest.

Referring to FIG. 12, a flowchart of a process 1200 for detecting deepfake media in media at rest is shown. At block 1202, the enterprise users securely upload images and audio recordings of employees and executives through a cloud interface. The images and audio recordings of the enterprise users are received at the pre-processor 304 of the mid-link server 106.

At block 1204, the images and audio recordings are pre-processed for generating fingerprints. In one example, the images and audio recordings are pre-processed using a trained model. The pre-processing of images involves resampling and face detection, ensuring high-quality images. The pre-processing of audio recordings includes segmenting them into audio characteristics for each user within the enterprise.

At block 1206, fingerprints are generated for the pre-processed images and audio recordings. Fingerprints are the unique identifiers that identify each employee of the enterprise. The fingerprints are generated by using hashing and deep learning embedding.

At block 1208, the generated fingerprints are normalized with the respective image and audio of each employee by the normalizer 306. The normalization includes matching the image and the audio of the user of the enterprise with the stored fingerprints of the user. The matched images and audio with the fingerprints are referred to as normalized fingerprints.

At block 1210, the generated fingerprints at block 1208 are stored in the database 308 or the enterprise server 112. These generated normalized fingerprints are the pre-stored fingerprints of the employees of the enterprise or the authenticated users. To preserve the privacy of the employees, only fingerprints are stored in the database 308, while the original media is deleted to ensure security.

At block 1212, images and audio recordings are extracted from the documents and videos uploaded on the enterprise server 112 or stored on the user device(s) 104 by the end-user(s) 102, including employees and executives of the enterprise. The image and audio are included as visual and audio data. The documents and videos are referred to as static data, as uploaded by the employees and executives of the enterprise.

At block 1214, digital fingerprints are generated for the extracted images and audio from the documents and videos uploaded by the employees. The digital fingerprints are generated by the fingerprint generator 314.

At block 1216, the generated digital fingerprints are compared with the pre-stored fingerprints of the enterprise's employees. Pre-stored fingerprints are the normalized fingerprints that are stored in the database 308 for each employee of the enterprise. The pre-stored fingerprints are the normalized fingerprints.

At block 1218, the generated digital fingerprints are compared with the pre-stored fingerprints. The deepfake detection system 100 identifies any mismatches between the generated digital fingerprints and the pre-stored fingerprints.

At block 1220, if any mismatch is identified at block 1218, the deepfake detection system 100 analyzes the mismatch through the deepfake detection model for identifying further mismatches. The deepfake detection model analyzes the images and audio recordings for synthetic artifacts.

At block 1222, the deepfake detection model generates the deepfake detection score based on the analysis. The deepfake detection score combines the outcomes of the fingerprint mismatch and the deepfake detection model. The deepfake detection score is compared with the threshold, and appropriate actions are taken based on the comparison of the deepfake detection score with the threshold.

At block 1224, the fingerprint mismatch and the deepfake detection score are combined to determine the level of deepfake. Policies are applied based on the level of deepfake. The policies are identified from the policy store 110. The policy store 110 includes a list of authorized users with their corresponding policies set by the enterprise. The policy store 110 also includes a table of actions against these policies. The actions involve blocking, partially blocking, or allowed. The policies are specified based on the user designation, location, UEBA, profile etc. The policies change based on the level of deepfake detected and user requisites. The deepfake detection system 100 generates real-time alerts and reports for the security teams, the users, and the administration of the enterprise.

Figure 13:
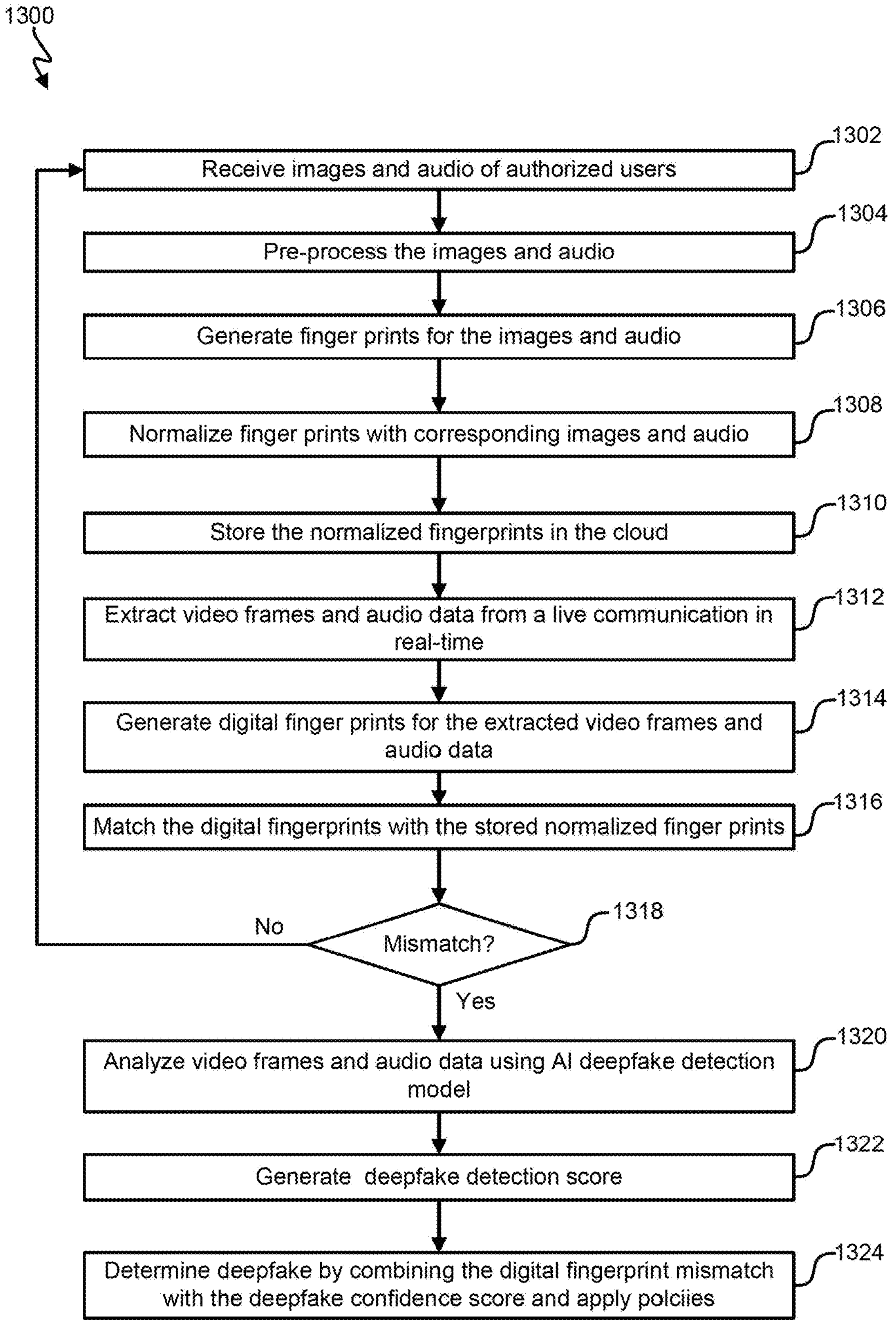
FIG. 13 illustrates a flowchart of an embodiment for detecting deepfakes in real-time during a live conference of an enterprise.

Referring to FIG. 13, a flowchart of a process 1300 for detecting deepfakes in real-time during a live conference of an enterprise is shown. At block 1302, enterprise users securely upload images and audio recordings of employees and executives through a cloud interface. The images and the audio recordings of the enterprise users are received at the pre-processor 304 of the mid-link server 106.

At block 1304, the images and the audio recordings are pre-processed for generating fingerprints. In one example, the images and the audio recordings are pre-processed using a trained model. The pre-processing of images includes resampling the images and identifying faces from the images by ensuring high quality images. The pre-processing of audio recording includes segmenting audio recording into audio characteristics of every single user of the enterprise.

At block 1306, fingerprints are generated for the pre-processed images and audio recordings. Fingerprints are the unique identifiers that identifies every single employee of the enterprise. The fingerprints are generated by using hashing and deep learning embeddings in a hybrid approach.

At block 1308, the generated fingerprints are normalized with the respective image and audio of each employee by the normalizer 306. The normalization includes matching the image and the audio of the user of the enterprise with the fingerprints of the user. The matched images and audio with the fingerprints are referred to as the normalized fingerprints.

At block 1310, the generated fingerprints at block 1308 are stored in the database 308 or the enterprise server 112. The generated fingerprints are the pre-stored fingerprints of the employees of the enterprise or the authenticated users. To preserve privacy of the employees, merely fingerprints are stored in the database 308, while original media is deleted to ensure security.

At block 1312, key video frames and audio are extracted from a live video conference in real-time. The list of participants of the live conference is identified from the attendee list of an in-meeting metadata through the web server 108. The key video frames and the audio are referred to as real-time data as it is the real-time network traffic communication of the live conference.

At block 1314, digital fingerprints are generated for the extracted videos and audio from the live conference. At block 1316, the generated digital fingerprints are compared with the pre-stored fingerprints of the employees of the enterprise. Pre-stored fingerprints are the normalized fingerprints that are stored in the database 308 for every single employee of the enterprise. The pre-stored fingerprints are the normalized fingerprints.

At block 1318, the generated digital fingerprints are compared with the pre-stored fingerprints. The deepfake detection system 100 identifies mismatches between the generated digital fingerprints and the pre-stored fingerprints.

At block 1320, if any mismatch is identified at block 1318, the deepfake detection system 100 analyzes the mismatch through the deepfake detection model for identifying further mismatch. The deepfake detection model analyzes the key video frames and the audio from the live conference for detecting synthetic artifacts.

At block 1322, the deepfake detection model generates a deepfake detection score based on the analysis. The deepfake detection score combines the outcomes of the fingerprint mismatch and the deepfake detection model. The deepfake detection score is compared with the threshold and appropriate actions are taken based on the comparison of the deepfake detection score with the threshold.

At block 1324, the fingerprint mismatch and the deepfake detection score are combined to determine the level of deepfake. Policies are applied based on the level of deepfake. The policies are identified from the policy store 110. The policy store 110 includes a list of authorized users with their corresponding policies set by the enterprise. The policy store 110 also includes a table of actions against these policies. The actions include blocking, partially blocking, or allowed. The policies are specified based on the user designation, location, UEBA, profile etc. The policies change based on the level of deepfake detected and user requisites. In one example, applying the policies includes generating real-time security alerts and reports for the security teams, users, and the administrators of the enterprise using the deepfake detection system 100. The enterprise can take real-time actions, such as flagging the participants or requesting re-verification of identification.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed but could have additional steps not included in the figure. A process may correspond to a method, a function, a procedure, a subroutine, a subprogram, etc. When a process corresponds to a function, its termination corresponds to a return of the function to the calling function or the main function.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, non-volatile, or other storage medium and is not to be limited to any particular type of memory or number of memories, or type of media upon which memory is stored.

In the embodiments described above, for the purposes of illustration, processes may have been described in a particular order. It should be appreciated that in alternate embodiments, the methods may be performed in a different order than that described. It should also be appreciated that the methods and/or system components described above may be performed by hardware and/or software components (including integrated circuits, processing units, and the like), or may be embodied in sequences of machine-readable, or computer-readable, instructions, which may be used to cause a machine, such as a general-purpose or special-purpose processor or logic circuits programmed with the instructions to perform the methods. Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. These machine-readable instructions may be stored on one or more machine-readable mediums, such as CD-ROMs or other type of optical disks, solid-state drives, tape cartridges, ROMs, RAMs, EPROMS, EEPROMs, magnetic or optical cards, flash memory, or other types of machine-readable mediums suitable for storing electronic instructions. Alternatively, the methods may be performed by a combination of hardware and software.

Implementation of the techniques, blocks, steps, and means described above may be done in various ways. For example, these techniques, blocks, steps, and means may be implemented in hardware, software, or a combination thereof. For a digital hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. For analog circuits, they can be implemented with discreet components or using monolithic microwave integrated circuit (MMIC), radio frequency integrated circuit (RFIC), and/or micro electro-mechanical systems (MEMS) technologies.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

The methods, systems, devices, graphs, and tables discussed herein are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims. Additionally, the techniques discussed herein may provide differing results with different types of context awareness classifiers.

Unless defined otherwise, all technical and scientific terms used herein have the same meaning as commonly or conventionally understood. As used herein, the articles "a" and "an" refer to one or to more than one (i.e., to at least one) of the grammatical object of the article. By way of example, "an element" means one element or more than one element. "About" and/or "approximately" as used herein when referring to a measurable value such as an amount, a temporal duration, and the like, encompasses variations of +20% or +10%, +5%, or +0.1% from the specified value, as such variations are appropriate to in the context of the systems, devices, circuits, methods, and other implementations described herein. "Substantially" as used herein when referring to a measurable value such as an amount, a temporal duration, a physical attribute (such as frequency), and the like, also encompasses variations of +20% or +10%, +5%, or +0.1% from the specified value, as such variations are appropriate to in the context of the systems, devices, circuits, methods, and other implementations described herein.

As used herein, including in the claims, "and" as used in a list of items prefaced by "at least one of" or "one or more of" indicates that any combination of the listed items may be used. For example, a list of "at least one of A, B, and C" includes any of the combinations A or B or C or AB or AC or BC and/or ABC (i.e., A and B and C). Furthermore, to the extent more than one occurrence or use of the items A, B, or C is possible, multiple uses of A, B, and/or C may form part of the contemplated combinations. For example, a list of "at least one of A, B, and C" may also include AA, AAB, AAA, BB, etc.

While illustrative and presently preferred embodiments of the disclosed systems, methods, and machine-readable media have been described in detail herein, it is to be understood that the inventive concepts may be otherwise variously embodied and employed, and that the appended claims are intended to be construed to include such variations, except as limited by the prior art.

While the principles of the disclosure have been described above in connection with specific apparatuses and methods, it is to be clearly understood that this description is made only by way of example and not as limitation on the scope of the disclosure.

We claim:

1. A method for detecting deepfake in live network traffic communications and stored media, the method comprising:

extracting visual data and audio of a plurality of users of an enterprise;

generating digital fingerprints from the extracted visual data and the audio;

matching the generated digital fingerprints with pre-stored normalized fingerprints to produce an output of the matching;

analyzing the extracted visual data and the audio using an artificial intelligence (AI)-detection model;

generating a deepfake detection score based on the analysis by the AI-detection model;

generating a fingerprint mismatch flag based on the output of the matching;

generating a deepfake machine learning flag based on the deepfake detection score;

combining the output of the matching and the deepfake detection score to determine a level of deepfake in the extracted visual data and audio;

applying a plurality of policies in real-time based on the level of deepfake in the extracted visual data and the audio, wherein applying the plurality of policies includes blocking access of enterprise content to a user based on a user role in the enterprise, upon triggering of the fingerprint mismatch flag and the deepfake machine learning flag; and where in the plurality of policies are predefined in a policy store of the enterprise based on the user role and when the user role corresponds to a Trainee in the enterprise and the level of deepfake is indicated by:

(i) the fingerprint mismatch flag, a policy comprises holding access of the enterprise content to the user and re-authenticating the user, (ii) the deepfake machine learning flag, the policy comprises holding access of the enterprise content until an administrator of the enterprise contacts the user, or (iii) both the fingerprint mismatch flag and the deepfake machine learning flag, the policy comprises blocking user access of the enterprise content and sending an alert to a user device of the user and an administration of the enterprise.

2. The method for detecting deepfake in live network traffic communications and stored media of claim 1, further comprising:

pre-storing the normalized fingerprints includes:

receiving images and audio recordings of the plurality of users;

pre-processing the received images and the audio recordings using a trained model;

generating fingerprints for the pre-processed images and the audio recordings;

normalizing the fingerprints with corresponding images and the audio recordings of the plurality of users; and pre-storing the normalized fingerprints of the plurality of users in a database.

3. The method for detecting deepfake in live network traffic communications and stored media of claim 2, wherein the pre-processing is performed by:

cropping and resampling the received images, and extracting one or more audio features from the audio recordings.

4. The method for detecting deepfake in live network traffic communications and stored media of claim 3, wherein extracting of the one or more audio features is performed by segmenting the audio recordings into key audio characteristics.

5. The method for detecting deepfake in live network traffic communications and stored media of claim 2, wherein the trained model is a custom object detection model.

6. The method for detecting deepfake in live network traffic communications and stored media of claim 1, wherein extracting the visual data and the audio of the plurality of users includes extracting video frames and the audio by monitoring the live network traffic, and the live network traffic includes a live communication between two or more of the plurality of users.

7. The method for detecting deepfake in live network traffic communications and stored media of claim 1, wherein extracting the visual data and the audio of the plurality of users is performed by extracting images and the audio from an enterprise data or the stored media, and the enterprise data comprises documents and videos uploaded by the plurality of users of the enterprise.

8. The method for detecting deepfake in live network traffic communications and stored media of claim 1, wherein applying the plurality of policies comprises generating real-time security alerts and reports, and flagging the plurality of users.

9. The method for detecting deepfake in live network traffic communications and stored media of claim 1, wherein the plurality of policies are predefined in a policy store of the enterprise based on the user role and when the user role corresponds to Senior Management in the enterprise and the level of deepfake is indicated by triggering of (i) the fingerprint mismatch flag, (ii) the deepfake machine learning flag, or (iii) both the fingerprint mismatch flag and the deepfake machine learning flag, a policy comprises blocking access of the enterprise content to the user and contacting the user immediately.

10. A deepfake detection system for detecting deepfake in live network traffic communications and stored media, the deepfake detection system comprising:

one or more processors, and memory coupled with the one or more processors, the memory configured to store instructions that when executed by the one or more processors cause the one or more processors to:

extract, by a mid-link server, a visual data and an audio of a plurality of users of an enterprise;

generate, by the mid-link server, digital fingerprints from the extracted visual data and the audio;

match, by the mid-link server, the generated digital fingerprints with pre-stored normalized fingerprints to produce an output of the match;

analyze, by the mid-link server, the extracted visual data and the audio using an artificial intelligence (AI)-detection model;

generate, by the mid-link server, a deepfake detection score based on the analysis by the AI-detection model;

generate, by the mid-link server, a fingerprint mismatch flag based on the output of the matching;

generate, by the mid-link server, a deepfake machine learning flag based on the deepfake detection score;

combine, by the mid-link server, the output of the match and the deepfake detection score to determine a level of deepfake in the extracted visual data and the audio;

apply, by the mid-link server, a plurality of policies in real-time based on the level of deepfake in the extracted visual data and the audio, wherein applying the plurality of policies includes blocking access of enterprise content to a user based on a user role in the enterprise, upon triggering of the fingerprint mismatch flag and the deepfake machine learning flag; and where in the plurality of policies are predefined in a policy store of the enterprise based on the user role and when the user role corresponds to a Trainee in the enterprise and the level of deepfake is indicated by:

(i) the fingerprint mismatch flag, a policy comprises holding access of the enterprise content to the user and re-authenticating the user, (ii) the deepfake machine learning flag, the policy comprises holding access of the enterprise content until an administrator of the enterprise contacts the user, or (iii) both the fingerprint mismatch flag and the deepfake machine learning flag, the policy comprises blocking user access of the enterprise content and sending an alert to a user device of the user and an administration of the enterprise.

11. The deepfake detection system for detecting deepfake in live network traffic communications and stored media of claim 10, wherein the one or more processors are further configured to:

receive images and audio recordings of the plurality of users;

pre-process the received images and the audio recordings using a trained model;

generate fingerprints for the pre-processed images and the audio recordings;

normalize the fingerprints with corresponding images and the audio recordings of the plurality of users; and pre-store the normalized fingerprints of the plurality of users in a database of the mid-link server.

12. The deepfake detection system for detecting deepfake in live network traffic communications and stored media of claim 11, wherein the pre-processing the images and the audio recordings is performed by cropping and resampling the received images and extracting one or more audio features from the audio recordings.

13. The deepfake detection system for detecting deepfake in live network traffic communications and stored media of claim 12, wherein the extracting of the one or more audio features is performed by segmenting the audio recordings into key audio characteristics.

14. The deepfake detection system for detecting deepfake in live network traffic communications and stored media of claim 11, wherein the trained model is a custom object detection model.

15. The deepfake detection system for detecting deepfake in live network traffic communications and stored media of claim 10, wherein extraction of the visual data and the audio of the plurality of users is performed by extracting video frames and the audio by monitoring live network traffic, and the live network traffic includes a live communication between two or more of the users.

16. The deepfake detection system for detecting deepfake in live network traffic communications and stored media of claim 10, wherein extraction of the visual data and the audio of the plurality of users is performed by extracting images and the audio from enterprise data and/or the stored media, and the enterprise data comprises documents and videos uploaded by the plurality of users of the enterprise.

17. The deepfake detection system for detecting deepfake in live network traffic communications and stored media of claim 10, wherein the plurality of policies includes generating real-time security alerts and reports, and by flagging the plurality of users.

18. A non-transitory computer-readable storage medium having stored thereon instructions for causing at least one computer to facilitate a method for detecting deepfake in live network traffic communications and stored media, the method comprising:

extracting visual data and audio of a plurality of users of an enterprise;

generating digital fingerprints from the extracted visual data and the audio;

matching the generated digital fingerprints with pre-stored normalized fingerprints to produce an output of the matching;

analyzing the extracted visual data and the audio using an artificial intelligence (AI)-detection model;

generating a deepfake detection score based on the analysis by the AI-detection model;

generating a fingerprint mismatch flag based on the output of the matching;

generating a deepfake machine learning flag based on the deepfake detection score;

combining the output of the matching and the deepfake detection score to determine a level of deepfake in the extracted visual data and the audio;

applying a plurality of policies in real-time based on the level of deepfake in the extracted visual data and the audio, wherein applying the plurality of policies includes blocking access of enterprise content to a user based on a user role in the enterprise, upon triggering of the fingerprint mismatch flag and the deepfake machine learning flag; and wherein the plurality of policies are predefined in a policy store of the enterprise based on the user role and when the user role corresponds to a Trainee in the enterprise and the level of deepfake is indicated by:

(i) the fingerprint mismatch flag, a policy comprises holding access of the enterprise content to the user and re-authenticating the user, (ii) the deepfake machine learning flag, the policy comprises holding access of the enterprise content until an administrator of the enterprise contacts the user, or (iii) both the fingerprint mismatch flag and the deepfake machine learning flag, the policy comprises blocking user access of the enterprise content and sending an alert to a user device of the user and an administration of the enterprise.

19. The non-transitory computer-readable storage medium having stored thereon instructions for causing at least one computer to facilitate a method for detecting deepfake in live network traffic communications and stored media of claim 18, wherein the method further comprises:

receiving images and audio recordings of the plurality of users;

pre-processing the received images and the audio recordings using a trained model;

generating fingerprints for the pre-processed images and the audio recordings;

normalizing the fingerprints with corresponding images and the audio recordings of the plurality of users; and pre-storing the normalized fingerprints of the plurality of users in a database.

20. The non-transitory computer-readable storage medium having stored thereon instructions for causing at least one computer to facilitate a method for detecting deepfake in live network traffic communications and stored media of claim 18, wherein extracting the visual data and the audio of the plurality of users includes extracting video frames and the audio by monitoring live network traffic, and the live network traffic includes a live communication between two or more of the plurality of users.

21. The non-transitory computer-readable storage medium having stored thereon instructions for causing at least one computer to facilitate a method for detecting deepfake in live network traffic communications and stored media of claim 18, wherein extracting the visual data and the audio of the plurality of users includes extracting images and the audio from enterprise data and/or the stored media, and the enterprise data comprises documents and videos uploaded by the plurality of users of the enterprise.

* * * * *